United States Patent
Kumar et al.

(10) Patent No.: US 12,372,381 B2
(45) Date of Patent: Jul. 29, 2025

(54) SIGNAL CONDITIONING IN A POSITION SENSING SYSTEM

(71) Applicant: Hamilton Sundstrand Corporation, Charlotte, NC (US)

(72) Inventors: Dhananjay Kumar, Bangalore (IN); Swathika Sreedhar, Tamil Nadu (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 337 days.

(21) Appl. No.: 17/988,297

(22) Filed: Nov. 16, 2022

(65) Prior Publication Data

US 2024/0094032 A1    Mar. 21, 2024

(30) Foreign Application Priority Data

Sep. 19, 2022  (IN) ............... 202211053559

(51) Int. Cl.
G01D 5/22 (2006.01)
G01B 7/00 (2006.01)

(52) U.S. Cl.
CPC ........... *G01D 5/2291* (2013.01); *G01B 7/003* (2013.01)

(58) Field of Classification Search
CPC ..... G01B 7/003; G01D 5/2291; G01D 5/2266
See application file for complete search history.

(56) References Cited

U.S. PATENT DOCUMENTS

| | | | |
|---|---|---|---|
| 3,936,720 A * | 2/1976 | Von Recklinghausen | G01R 17/02 327/104 |
| 4,140,998 A | 2/1979 | Bettle | |
| 4,847,548 A * | 7/1989 | Lafler | G01D 5/2291 318/657 |
| 5,256,960 A | 10/1993 | Novini | |
| 5,327,030 A * | 7/1994 | DeVito | G06G 7/161 318/657 |
| 5,422,555 A * | 6/1995 | Paige | G01B 7/003 318/657 |
| 5,708,368 A | 1/1998 | Mallory | |
| 5,777,468 A * | 7/1998 | Maher | G01D 3/036 324/202 |
| 6,864,808 B2 | 3/2005 | McBrien | |
| 7,271,582 B2 | 9/2007 | Proksch et al. | |
| 7,459,904 B2 | 12/2008 | Proksch et al. | |

(Continued)

FOREIGN PATENT DOCUMENTS

| | | |
|---|---|---|
| DE | 202018107381 U1 | 1/2019 |
| FR | 2921166 A1 | 3/2009 |

OTHER PUBLICATIONS

"Simplification Grace", Toute L'Electronique, Societe Des Editions Radio. Paris, FR, No. 253, Apr. 1987, pp. 64-71.

(Continued)

*Primary Examiner* — Eman A Alkafawi
*Assistant Examiner* — Suresh K Rajaputra
(74) *Attorney, Agent, or Firm* — CANTOR COLBURN LLP

(57) ABSTRACT

A position sensing system includes a linear variable differential transformer (LVDT) to provide a first output voltage and a second output voltage. The position sensing system also includes two precision rectifiers. Each of the precision rectifiers comprises only operational amplifiers and resistors and obtains the first output voltage or the second output voltage as an input and to provide a full-wave rectified output.

18 Claims, 2 Drawing Sheets

(56) References Cited

U.S. PATENT DOCUMENTS

| | | |
|---|---|---|
| 7,639,051 B2 | 12/2009 | Panzer |
| 9,528,859 B2 | 12/2016 | Bocek |
| 9,581,425 B2 | 2/2017 | Buelau et al. |
| 2005/0046593 A1 | 3/2005 | Tulpule et al. |
| 2008/0316079 A1 | 12/2008 | Games |

OTHER PUBLICATIONS

Abstract for FR2921166 (A1), Published: Mar. 20, 2009, 1 page.
Abstract of DE202018107381 (U1), Published: Jan. 23, 2019, 1 page.
Blanes Jose, "Precision full-wave signal rectifier needs no diodes", Sep. 30, 2015, Retrieved from the Internet: URL: https://www.radiolocman.com/shem/schematics.html?di=161475 [retrieved on Jan. 25, 2024], 11 pages.
European Search Report for Application No. 23196586.4, mailed Feb. 9, 2024, 11 pages.
Kester, W. "Practical Design Techniques for Sensor Signal Conditioning", Internet Citation, 1999, Retrieved from the Internet: URL:http://www.analog.com/en/content/0,2886, 759_776_124751, 00.html [retrieved on Aug. 3, 2007], 31 pages.
Szczyrbak Jackson, et al. "LVDT Signal Conditioning Techniques", Apr. 1997, retrieved from the Internet: URL:http://nliebeausx.free.fr/ressources/signal.pdf [retrieved on Jan. 24, 2024], 18 pages.
Analog Devices, AD598, "LVDT Signal Conditioner", 16 pages, pre 2013.
Gerstenhaber, et al. "More Value from Your Absolute Value Circuit—Difference Amplifier Enables Low-Power, High-Performance Absolute Value Circuit" Analog Dialogue 44-04 Back Burner, (Apr. 2010), www.analog.com/analogdialogue, pp. 1-2.

* cited by examiner

SIGNAL CONDITIONING IN A POSITION SENSING SYSTEM

CROSS-REFERENCE TO RELATED APPLICATIONS

This application claims the benefit of IN Provisional Application No. 202211053559 filed Sep. 19, 2022, the disclosure of which is incorporated herein by reference in its entirety.

BACKGROUND

Exemplary embodiments pertain to the art of position estimation and, in particular, to signal conditioning in a position sensing system.

Position estimation may be important for monitoring and operating a number of systems. For example, position sensing of the landing gear facilitates safe operation of an aircraft. A linear variable differential transformer (LVDT) is a type of position sensor. The electrical output of the LVDT may be amplitude demodulated using a signal conditioning circuit to decode the position information.

BRIEF DESCRIPTION

In one exemplary embodiment, a position sensing system includes a linear variable differential transformer (LVDT) to provide a first output voltage and a second output voltage. The position sensing system also includes two precision rectifiers. Each of the precision rectifiers comprises only operational amplifiers and resistors and obtains the first output voltage or the second output voltage as an input and to provide a full-wave rectified output.

In addition to one or more of the features described herein, each of the precision rectifiers includes a first operational amplifier, a second operational amplifier, and a third operational amplifier.

In addition to one or more of the features described herein, based on the input being a negative half cycle of the first output voltage or the second output voltage, the first operational amplifier outputs a first half-wave rectified sine wave and the second operational amplifier is configured to output 0 volts.

In addition to one or more of the features described herein, the first operational amplifier is an inverting operational amplifier, and the input is provided to an inverting input of the first operational amplifier.

In addition to one or more of the features described herein, based on the input being a positive half cycle of the first output voltage or the second output voltage, the first operational amplifier outputs 0 volts and the second operational amplifier is configured to output a second half-wave rectified sine wave.

In addition to one or more of the features described herein, the second operational amplifier is a voltage follower, and the input is provided to a non-inverting input of the second operational amplifier.

In addition to one or more of the features described herein, the third operational amplifier combines the first half-wave rectified sine wave and the second half-wave rectified sine wave to provide the full-wave rectified output.

In addition to one or more of the features described herein, the LVDT includes a primary winding, a first secondary winding, and a second secondary winding, the first output voltage is output by the first secondary winding, and the second output voltage is output by the second secondary winding.

In addition to one or more of the features described herein, the LVDT also includes a magnetic core connected to a moving part whose position is sensed by the position sensing system.

In addition to one or more of the features described herein, the position sensing system also includes a processor to obtain the position based on the full-wave rectified output provided by the two precision rectifiers.

In another exemplary embodiment, a method of assembling a position sensing system includes connecting a linear variable differential transformer (LVDT) to a moving part whose position is sensed by the position sensing system and arranging the LVDT to provide a first output voltage and a second output voltage. The method also includes arranging two precision rectifiers such that each of the two precision rectifiers obtains either the first output voltage or the second output voltage as an input and provides a full-wave rectified output, and each of the precision rectifiers comprises only operational amplifiers and resistors.

In addition to one or more of the features described herein, arranging each of the precision rectifiers includes arranging a first operational amplifier, a second operational amplifier, and a third operational amplifier.

In addition to one or more of the features described herein, the arranging the first operational amplifier and the second operational amplifier includes the first operational amplifier outputting a first half-wave rectified sine wave and the second operational amplifier outputting 0 volts based on the input being a negative half cycle of the first output voltage or the second output voltage.

In addition to one or more of the features described herein, the first operational amplifier is an inverting operational amplifier, and the arranging the first operational amplifier includes providing the input to an inverting input of the first operational amplifier.

In addition to one or more of the features described herein, the arranging the first operational amplifier and the second operational amplifier includes the first operational amplifier outputting 0 volts and the second operational amplifier outputting a second half-wave rectified sine wave based on the input being a positive half cycle of the first output voltage or the second output voltage.

In addition to one or more of the features described herein, the second operational amplifier is a voltage follower, and the arranging the second operational amplifier includes providing the input to a non-inverting input of the second operational amplifier.

In addition to one or more of the features described herein, the arranging the third operational amplifier includes the third operational amplifier combining the first half-wave rectified sine wave and the second half-wave rectified sine wave to provide the full-wave rectified output.

In addition to one or more of the features described herein, the LVDT includes a primary winding, a first secondary winding, and a second secondary winding, and the arranging the LVDT includes arranging the first secondary winding to provide the first output voltage and arranging the second secondary winding to provide the second output voltage.

In addition to one or more of the features described herein, the connecting the LVDT to the moving part includes connecting a magnetic core of the LVDT to the moving part.

In addition to one or more of the features described herein, the method also includes configuring a processor to obtain the position based on the full-wave rectified output provided by the two precision rectifiers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments of the systems and methods detailed herein relate to signal conditioning in a position sensing system. An LVDT is the exemplary position sensing system used to discuss the signal conditioning according to one or more embodiments. As previously noted, linear position sensing may be necessary in various applications and an LVDT may be used. An LVDT generally includes a primary winding and two secondary windings. The output of each secondary winding of an LVDT is a linear function of its core displacement within its linear range of motion. A signal conditioning circuit may be used for amplitude demodulation of the output. The signal conditioning involves a precision rectifier detailed according to exemplary embodiments.

Prior precision rectifiers used for signal conditioning include dual-supply operational amplifiers and fast-switching diodes. The diodes create temperature dependency, because leakage current of the diodes varies with temperature (i.e., leakage current is higher at higher temperatures). This results in an error that is directly proportional to the operating temperature of the LVDT. The error is exacerbated by the fact that diode leakage currents are unequal at each of the secondary windings due to device mismatch. According to one or more embodiments, diodes are eliminated from the precision full wave rectifier of each signal conditioning circuit used in the LVDT. A purely operational amplifier-based rectification eliminates the errors introduced by leakage current in the prior approaches.

Figure 1:
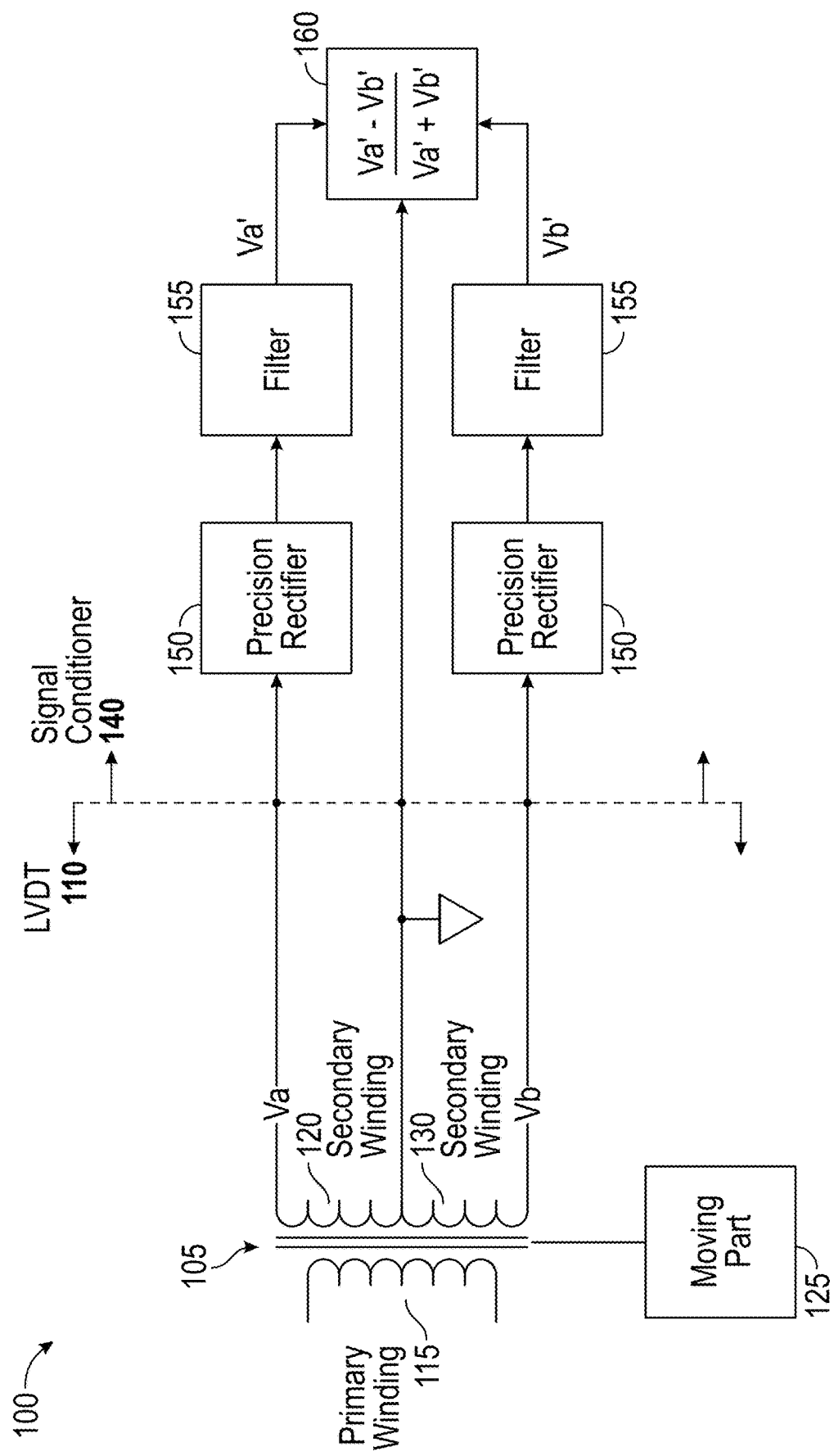
FIG. 1 is a block diagram of a position sensing system according to one or more embodiments.

FIG. 1 is a block diagram of a position sensing system 100 according to one or more embodiments. The position sensing system 100 generally includes an LVDT 110 coupled to the moving part 125 whose position is to be determined and a signal conditioner 140 that estimates the position based on signals from the LVDT 110. The LVDT 110 is known and briefly described herein. Generally, the LVDT 110 includes a primary winding 115 positioned between two secondary windings 120, 130. According to an exemplary embodiment, each of the windings 115, 120, 130 may be wound on a hollow glass reinforced polymer form but other configurations are possible. The winding assembly is the stationary element of the LVDT 110.

The LVDT 110 also includes a magnetic core 105. In operation, the magnetic core 105 may be arranged and configured such that it moves freely inside the windings 115, 120, 130. The magnetic core 105 is connected to the moving part 125 whose position is being measured. A sinusoidal excitation applied to the primary winding 115 results in flux coupling to the secondary windings 120, 130 thorough the magnetic core 105. The position of the moving core 105 will cause different voltages to be induced in the second windings 120, 130 based on its relative position. The difference in induced voltages Va and Vb corresponding, respectively, with the secondary windings 120, 130 indicates the distance moved by the moving part 125 while the phase of the voltages Va, Vb indicates the direction of movement. The output of each of the secondary windings 120, 130 is a linear function of its displacement within its linear range of motion.

The signal conditioner 140 includes a precision rectifier 150 and filter 155 associated with the output of each of the secondary windings 120, 130. The precision rectifier 150 quantifies the absolute value of the input alternating current (AC) signal (voltage Va or Vb) and the filter 150 eliminates noise and transients. The precision rectifier 150 is further detailed in FIG. 2. According to one or more embodiments, the design of the precision rectifier 150 and, specifically, the purely operational amplifier-based design (i.e., the elimination of any diodes from previous approaches) results in elimination of leakage current and the associated error. The output of the filter 155 associated with the secondary winding 120 is Va' and the output of the filter 155 associated with the secondary winding 130 is Vb'. A processor 160 may obtain the voltages Va' and Vb' from the filters 155 and estimate the position of the moving part 125 as:

$$\frac{V'_a - V'_b}{V'_a + V'_b} \qquad [\text{EQ. 1}]$$

Figure 2:
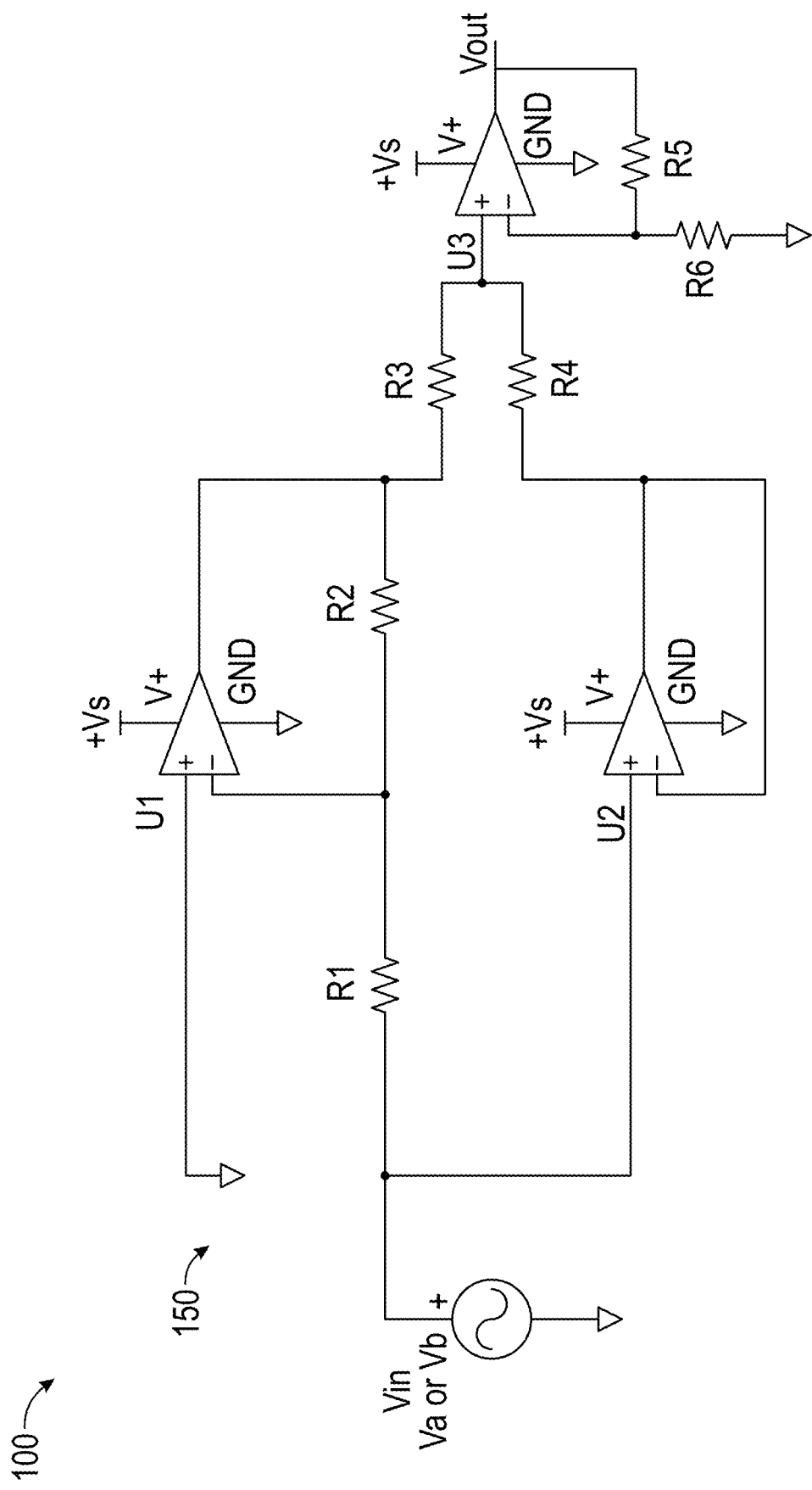
FIG. 2 is a schematic diagram of a precision rectifier used for signal conditioning in the position sensing system.

FIG. 2 is a schematic diagram of a precision rectifier 150 used for signal conditioning in the position sensing system 100. As previously noted, the precision rectifier 150 is operational amplifier-based without any diodes and their resultant leakage current. Specifically, three operational amplifiers U1, U2, and U3 are used in each precision rectifier 150. The input Vin of the precision rectifier 150 is either Va, which is output from the secondary winding 120, or Vb, which is output from the secondary winding 130. The supply voltage Vs for the operational amplifiers U1, U2, and U3 may be about 12 volts, for example. In addition to the three operational amplifiers U1, U2, and U3, the precision rectifier 150 may include resistors R1 through R6.

The operational amplifier U1 functions as an inverting operational amplifier with a gain of $$\frac{-R2}{R1}.$$

As indicated in FIG. 2, the input Vin is provided to the inverting input (−terminal) of the operational amplifier U1. The operational amplifier U2 functions as a voltage follower and, as shown in FIG. 2, the input Vin is provided to the non-inverting input (+terminal) of the operational amplifier U2. The operational amplifier U3 functions as a non-inverting summer whose output Vout is a rectified sine wave. This output Vout is filtered by the filter 155 to result in Va' (when the input Vin is Va) or Vb' (when the input Vin is Vb). The resistors R3, R4, R5, and R6 represent another gain stage that can shift the output Vout up (due to gain) or down (due to attenuation). If R3=R4=R5=R6, there is neither gain nor attenuation. Instead, the output of the operational amplifier U3 is a summation of the two inputs.

For the positive half cycle of the input sine wave Vin, the operational amplifier U2 outputs the half-wave rectified sine wave while the operational amplifier U1 outputs 0 volts. For the negative half cycle of the input sine wave Vin, the operational amplifier U1 rectifies the input such that its output is a half-wave rectified sine wave that is phase displaced by 180 degrees as compared with the output of the operational amplifier U2 during the positive half cycle input while the operational amplifier U2 outputs 0 volts. The operational amplifier U3 combines the half-wave rectified outputs of the operational amplifiers U1 and U2 to provide a full-wave rectified output Vout.

The precision rectifier 150 according to one or more embodiments is temperature-independent. As compared with prior designs, accuracy of the position estimation is improved based on using operational amplifiers with low offset and low drift. In addition, elimination of the diodes used in the prior designs results in reduced power loss and reduced size and cost for the precision rectifier 150 (e.g., reduced real estate on a printed circuit board (PCB)). Elimination of diodes also results in reduced power loss, because fast-switching diodes cause cross-over distortion and power loss.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A position sensing system comprising:
a linear variable differential transformer (LVDT) configured to provide a first output voltage and a second output voltage; and
two precision rectifiers, each of the precision rectifiers comprising only operational amplifiers and resistors and being configured to obtain the first output voltage or the second output voltage as an input and to provide a full-wave rectified output;
wherein each of the precision rectifiers includes a first operational amplifier, a second operational amplifier, and a third operational amplifier.

2. The position sensing system according to claim 1, wherein, based on the input being a negative half cycle of the first output voltage or the second output voltage, the first operational amplifier is configured to output a first half-wave rectified sine wave and the second operational amplifier is configured to output 0 volts.

3. The position sensing system according to claim 2, wherein the first operational amplifier is an inverting operational amplifier, and the input is provided to an inverting input of the first operational amplifier.

4. The position sensing system according to claim 2, wherein, based on the input being a positive half cycle of the first output voltage or the second output voltage, the first operational amplifier is configured to output 0 volts and the second operational amplifier is configured to output a second half-wave rectified sine wave.

5. The position sensing system according to claim 4, wherein the second operational amplifier is a voltage follower, and the input is provided to a non-inverting input of the second operational amplifier.

6. The position sensing system according to claim 4, wherein the third operational amplifier is configured to combine the first half-wave rectified sine wave and the second half-wave rectified sine wave to provide the full-wave rectified output.

7. The position sensing system according to claim 1, wherein the LVDT includes a primary winding, a first secondary winding, and a second secondary winding, the first output voltage is output by the first secondary winding, and the second output voltage is output by the second secondary winding.

8. The position sensing system according to claim 7, wherein the LVDT also includes a magnetic core connected to a moving part whose position is sensed by the position sensing system.

9. The position sensing system according to claim 1, further comprising a processor configured to obtain the position based on the full-wave rectified output provided by the two precision rectifiers.

10. A method of assembling a position sensing system, the method comprising:
connecting a linear variable differential transformer (LVDT) to a moving part whose position is sensed by the position sensing system and arranging the LVDT to provide a first output voltage and a second output voltage; and
arranging two precision rectifiers such that each of the two precision rectifiers obtains either the first output voltage or the second output voltage as an input and provides a full-wave rectified output, and each of the precision rectifiers comprises only operational amplifiers and resistors;
wherein arranging each of the precision rectifiers includes arranging a first operational amplifier, a second operational amplifier, and a third operational amplifier.

11. The method according to claim 10, wherein the arranging the first operational amplifier and the second operational amplifier includes the first operational amplifier outputting a first half-wave rectified sine wave and the second operation al amplifier outputting 0 volts based on the input being a negative half cycle of the first output voltage or the second output voltage.

12. The method according to claim 11, wherein the first operational amplifier is an inverting operational amplifier, and the arranging the first operational amplifier includes providing the input to an inverting input of the first operational amplifier.

13. The method according to claim 11, wherein the arranging the first operational amplifier and the second operational amplifier includes the first operational amplifier outputting 0 volts and the second operational amplifier outputting a second half-wave rectified sine wave based on the input being a positive half cycle of the first output voltage or the second output voltage.

14. The method according to claim 13, wherein the second operational amplifier is a voltage follower, and the arranging the second operational amplifier includes providing the input to a non-inverting input of the second operational amplifier.

15. The method according to claim 13, wherein the arranging the third operational amplifier includes the third operational amplifier combining the first half-wave rectified sine wave and the second half-wave rectified sine wave to provide the full-wave rectified output.

16. The method according to claim 10, wherein the LVDT includes a primary winding, a first secondary winding, and a second secondary winding, and the arranging the LVDT includes arranging the first secondary winding to provide the first output voltage and arranging the second secondary winding to provide the second output voltage.

17. The method according to claim 16, wherein the connecting the LVDT to the moving part includes connecting a magnetic core of the LVDT to the moving part.

18. The method according to claim 10, further comprising configuring a processor to obtain the position based on the full-wave rectified output provided by the two precision rectifiers.

* * * * *